(12) United States Patent
Hsieh et al.

(10) Patent No.: US 11,480,259 B2
(45) Date of Patent: Oct. 25, 2022

(54) FLUID-DRIVE DEVICE

(71) Applicant: Wistron Corp., New Taipei (TW)

(72) Inventors: Yi Fan Hsieh, New Taipei (TW); Chen An Sung, New Taipei (TW); Chia Liang Lai, New Taipei (TW)

(73) Assignee: WISTRON CORP., New Taipei (TW)

( * ) Notice: Subject to any disclaimer, the term of this patent is extended or adjusted under 35 U.S.C. 154(b) by 661 days.

(21) Appl. No.: 16/428,743

(22) Filed: May 31, 2019

(65) Prior Publication Data

US 2020/0284372 A1   Sep. 10, 2020

(30) Foreign Application Priority Data

Mar. 4, 2019   (TW) .................. 108106974

(51) Int. Cl.
| | | |
|---|---|---|
| *F16K 31/05* | (2006.01) | |
| *F16K 31/524* | (2006.01) | |
| *F16K 31/60* | (2006.01) | |
| *B65D 1/06* | (2006.01) | |
| *F01L 1/047* | (2006.01) | |
| *F04B 19/00* | (2006.01) | |

(52) U.S. Cl.
CPC .............. *F16K 31/055* (2013.01); *B65D 1/06* (2013.01); *F01L 1/047* (2013.01); *F16K 31/524* (2013.01); *F16K 31/60* (2013.01); *F04B 19/006* (2013.01)

(58) Field of Classification Search
CPC ...... F16K 31/055; F16K 31/524; F16K 31/60; F04B 19/006; B65D 1/06; F01L 1/047
USPC .......................................................... 74/568
See application file for complete search history.

(56) References Cited

U.S. PATENT DOCUMENTS

| | | | | |
|---|---|---|---|---|
| 4,277,226 A | * | 7/1981 | Archibald ............. | A61M 5/365 604/245 |
| 2002/0057972 A1 | | 5/2002 | Barinaga et al. | |
| 2009/0317270 A1 | * | 12/2009 | Reynolds ................. | A47K 5/16 417/410.1 |
| 2010/0284728 A1 | * | 11/2010 | Heil ...................... | A61C 17/227 401/270 |
| 2017/0198613 A1 | * | 7/2017 | Raimondi ............... | F01L 1/185 |
| 2021/0116048 A1 | * | 4/2021 | Alali ................. | F16K 31/52416 |
| 2021/0155005 A1 | * | 5/2021 | Singh .................... | F04B 43/026 |

FOREIGN PATENT DOCUMENTS

| | | | | |
|---|---|---|---|---|
| EP | 3196431 A1 | * | 7/2017 | ................ F01L 1/18 |
| WO | WO 2015/193675 A1 | | 12/2015 | |
| WO | WO 2019/032120 A1 | | 2/2019 | |

OTHER PUBLICATIONS

Definitions on, Dictionary.com., Mar. 2, 2022 (Year: 2022).*

* cited by examiner

*Primary Examiner* — Vinh Luong

(57) ABSTRACT

A fluid-drive device includes a base, a fluid container, a pressing mechanism, and a rotation mechanism. The fluid container is disposed on the base. The pressing mechanism is disposed on the base, and configured to press the fluid container. The rotation mechanism is connected to the pressing mechanism. The pressing mechanism presses the fluid container by rotating the rotation mechanism. The fluid-drive device may guide the flow of the detection fluid in the fluid container in a non-contact manner to reduce the contamination of the fluid specimen and increase the reliability of the detection.

15 Claims, 3 Drawing Sheets

FLUID-DRIVE DEVICE

CROSS-REFERENCE TO RELATED APPLICATIONS

This Application claims priority of Taiwan Patent Application No. 108106974 filed on Mar. 4, 2019, the entirety of which is incorporated by reference herein.

BACKGROUND

Field of the Invention

The present disclosure relates to a drive device, and in particular to a fluid-drive device.

Description of the Related Art

Microchannel chips are widely used in medical inspection analyzers (such as those used for virus detection, etc.) because of their small volume capacity, reduced cost of expensive reagents, convenient portability, and low energy consumption. Generally, a drive device is used to guide the flow of detection fluid in a microchannel chip to a specified position in a biomedical chip.

However, drive devices generally include contact-type pumps, valves and pipes. Once the detection fluid is driven by the drive device, the detection fluid tends to remain in the pumps, valves, and pipes, causing contamination of the detection fluid during subsequent inspections and affecting the final judgment (such as false positives and false negatives). Moreover, some of the residue of the detection fluid may crystallize, causing damage to the motor of the pump.

Accordingly, although existing drive devices have been generally adequate for their intended purposes, they have not been entirely satisfactory in all respects. Consequently, it would be desirable to provide a solution for improving these drive devices.

BRIEF SUMMARY

The present disclosure provides a fluid-drive device that can drive the detection fluid in the fluid container into the inspection groove in a non-contact manner to avoid contact with other devices during the detection fluid flow. Therefore, the detection fluid in the subsequent inspection may not be contaminated, thereby improving the accuracy of detection.

The present disclosure provides a fluid-drive device including a base, a fluid container, a pressing mechanism, and a rotation mechanism. The fluid container is disposed on the base. The pressing mechanism is disposed on the base, and configured to press the fluid container. The rotation mechanism is connected to the pressing mechanism. The rotation mechanism is rotated so as to make the pressing mechanism press the fluid container.

In some embodiments, the pressing mechanism includes a first rotation shaft and a first cam. The first rotation shaft is connected to the base and the rotation mechanism. The first cam is connected to the first rotation shaft, and configured to directly or indirectly press the fluid container. The first cam is rotated with the first rotation shaft by rotating the rotation mechanism.

In some embodiments, the pressing mechanism further includes a second cam connected to the first rotation shaft, and configured to directly or indirectly press the fluid container. The second cam is rotated with the first rotation shaft by rotating the rotation mechanism.

In some embodiments, the pressing mechanism includes a second rotation shaft and a second cam. The second rotation shaft is connected to the base and the rotation mechanism. The second cam is connected to the second rotation shaft, and configured to directly or indirectly press the fluid container. The second cam is rotated with the second rotation shaft by rotating the rotation mechanism.

In some embodiments, the shape of the first cam is different from a shape of the second cam, and the first cam extends parallel to the second cam.

In some embodiments, the pressing mechanism further includes a pressing element movably disposed on the base, and located between the first cam and the fluid container. The rotation mechanism is rotated so as to make the first cam move the pressing element, and to make the pressing element press the fluid container.

In some embodiments, the rotation mechanism includes a first connection plate and a first handle. The first connection plate is connected to the pressing mechanism. The first handle is connected to the connection plate.

In some embodiments, the rotation mechanism further includes a second connection plate, a second handle, and a connection rod. The second connection plate is connected to the pressing mechanism. The second handle is connected to the second connection plate. The connection rod is connected to the first handle and the second handle.

In some embodiments, the fluid container includes a fluid-guiding portion, a storage portion, and an inspection portion. The fluid-guiding portion has a fluid channel. The storage portion is disposed on the fluid-guiding portion, and has a storage chamber in communication with the fluid channel. The inspection portion is disposed on the fluid-guiding portion, and has an inspection groove connected to the fluid channel. The pressing mechanism is configured to press the storage portion, and the storage chamber is configured to store detection fluid. When the storage portion is pressed by the pressing mechanism, the detection fluid of the storage chamber flows to the inspection groove via the fluid channel.

In some embodiments, the storage portion further includes a storage body, and a thin film disposed on a top portion of the storage body, wherein the pressing mechanism is configured to press the thin film.

In conclusion, the fluid-drive device of the present disclosure guides the detection fluid in the storage portion to the inspection groove without contacting some components other than the fluid container. Therefore, the pollution of the detection fluid may be reduced, and the reliability of detection may be improved. Moreover, the fluid-drive device prevents the detection fluid from remaining to some components other than the fluid container, thereby reducing the maintenance costs of the fluid-drive device.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
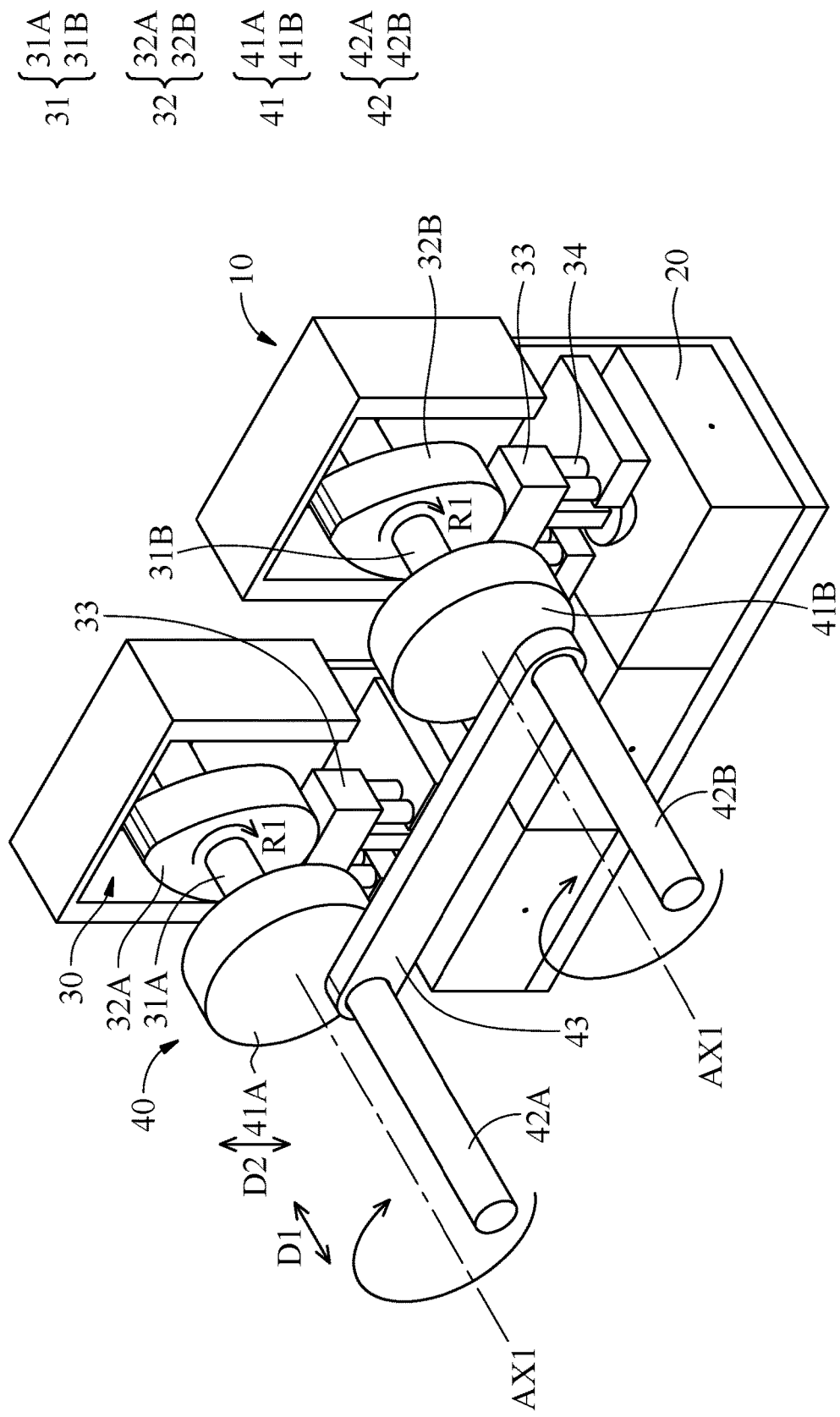
FIG. 1 is a perspective view of the fluid-drive device is accordance with a first embodiment.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, and thickness depicted in the drawings may not be drawn to scale or may be simplified for clarity of discussion; these drawings are merely intended for illustration.

Figure 2A:
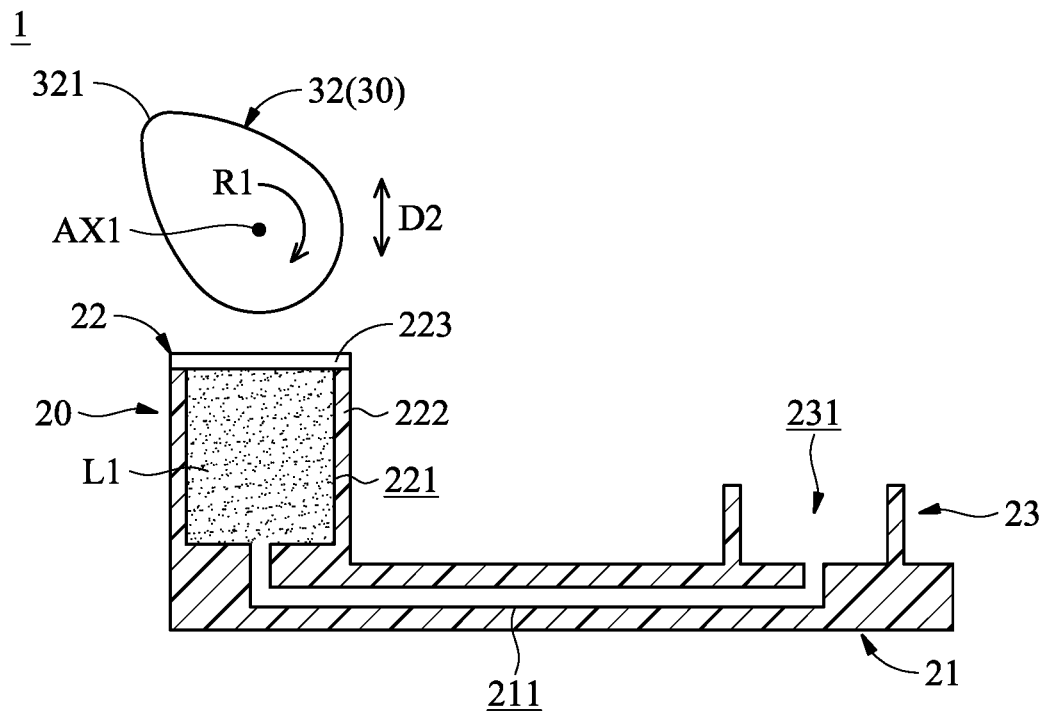
FIG. 2A and FIG. 2B are schematic views of the fluid-drive device in stages of actions in accordance with some embodiments of the present disclosure.
Figure 2B:
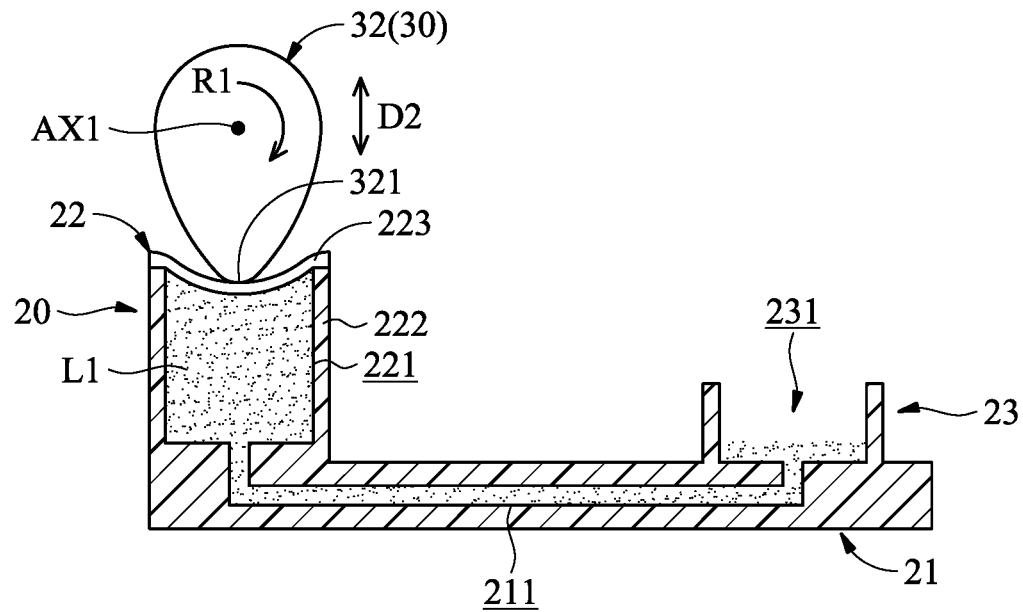

FIG. 1 is a perspective view of the fluid-drive device 1 is accordance with a first embodiment. The fluid-drive device 1 includes a base 10, fluid containers 20, a pressing mechanism 30, and a rotation mechanism 40. The fluid container 20 is detachably disposed on the base 10. The fluid container 20 is configured to receive a detection fluid L1 (as shown in FIG. 2A and FIG. 2B). In some embodiments, the detection fluid L1 may be biological specimens (such as blood or urine) and/or chemical liquid (such as reaction reagent), but it is not limited thereto.

The pressing mechanism 30 is disposed on the base 10, and configured to press the fluid container 20. The rotation mechanism 40 is connected to the pressing mechanism 30. The rotation mechanism 40 can be rotated so as to make the pressing mechanism 30 press the fluid container 20. After the fluid container 20 is pressed, the detection fluid L1 flows out, and the detection fluid L1 may be detected.

The pressing mechanism 30 includes rotation shafts (the first rotation shaft 31A and the second rotation shaft 31B) 31, cams (the first cam 32A and the second cam 32B) 32, and pressing elements 33. In the embodiment, the number of rotation shafts 31, the cams 32, and the pressing elements 33 may correspond to the number of fluid containers 20. In this embodiment, the pressing mechanism 30 includes two rotation shafts 31, two cams 32, and two pressing elements 33. In some embodiments, the pressing mechanism 30 includes a rotation shaft 31, a cam 32, and a pressing element 33. In some embodiments, the pressing mechanism 30 includes at least three rotation shafts 31, at least three cams 32, and at least three pressing elements 33.

Two ends of the rotation shafts 31 are respectively connected to the base 10 and the rotation mechanism 40, and may be located over the fluid container 20. In the embodiment, one end of the rotation shaft 31 is pivoted on the base 10, and other end of the rotation shaft 31 is affixed to the rotation mechanism 40. Each of two rotation shafts 31 extends in a central axis AX1, and is rotated about the central axis AX1. The central axis AX1 may extend in an extension direction D1. In other words, two central axes AX1 are parallel to each other.

The cam 32 is connected to the rotation shaft 31, and configured to directly or indirectly pass the fluid container 20. In the embodiment, the rotation shaft 31 may pass through the cam 32, and the cam 32 may extend perpendicular to the rotation shaft 31. In other words, two cams 32 are parallel to each other. By rotating the rotation mechanism 40, two cams (the first cam and the second cam) 32 are rotated with the rotation shafts (the first rotation shaft and the second rotation shaft) 31.

The shapes and/or the sizes of the cams 32 may be the same or different. In this embodiment, the shapes and/or the sizes of the cams 32 are the same. The orientations of the cams 32 relative to the rotation shaft 31 may be the same or different. In the embodiment, the orientations of the cams 32 are the same.

The pressing element 33 is movably disposed on the base 10, and located between the cam 32 and the fluid container 20. In the embodiment, the pressing mechanism 30 further includes retaining elements 34. The retaining elements 34 are affixed to the base 10, and the pressing element 33 is movably disposed on the retaining element 34. The retaining element 34 is configured to limit the movement of the pressing element 33 in a movement direction D2. By rotating the rotation mechanism 40, the cam 32 is moved by the pressing element 33, so as to make the pressing element 33 press against the fluid container 20. In some embodiments, the retaining element 34 provides an elastic force to the pressing element 33 so as to move the pressing element 33 to an initial position.

The rotation mechanism 40 includes connection plates (the first connection plate 41A and the second connection plate 41B) 41, handles (the first handle 42A and the second handle 42B) 42, and a connection rod 43. The connection plate 41 is connected to the rotation shaft 31 of the pressing mechanism 30, and may extend perpendicular to the rotation shaft 31. In the embodiment, the rotation shaft 31 is affixed to the center of the connection plate 41. In other words, the central axis AX1 passes through the center of the connection plate 41.

The handle 42 is connected to the connection plate 41. In the embodiment, the handle 42 is affixed to the edge of the connection plate 41, and far from the center of the connection plate 41 and the central axis AX1. The handle 42 and the rotation shaft 31 are affixed to two opposite sides of the connection plate 41. In other words, the connection plate 41 is located between the handle 42 and the rotation shaft 31. The handle 42 extends in the extension direction D1, and may be parallel to the rotation shaft 31.

The connection rod 43 is connected to two handles 42, and may be perpendicular to the extension direction D1. In the embodiment, the handles 42 may pass through two ends of the connection rod 43, and may be pivoted on the connection rod 43. Therefore, in the embodiment, when one of the handles 42 is rotated around the central axis AX1, the other handle 42 can be rotated around the central axis AX1.

In the embodiment, when the user wants to use the fluid-drive device 1 to measure the detection fluid L1, the handle 42 may be rotated to drive the rotation shafts 31 and the cams 32 to rotate. When the cams 32 are rotated, the cams 32 may move the pressing elements 33 to press the pressing elements 33 against the fluid containers 20.

FIG. 2A and FIG. 2B are schematic views of the fluid-drive device 1 in intermediate stages of actions in accordance with some embodiments of the present disclosure. For the purpose of clarity, the pressing elements 33 are not illustrated in FIG. 2A and FIG. 2B. Each of the fluid containers 20 may include a fluid-guiding portion 21, a storage portion 22, and an inspection portion 23. The fluid-guiding portion 21 may be a plate structure, and may extend perpendicular to the movement direction D2. The fluid-guiding portion 21 includes a fluid channel 211. In the embodiment, the fluid channel 211 may be a micro fluid channel. The minimum diameter of the fluid channel 211 may be in a range from 100 μm to 200 mm.

The storage portion 22 is disposed on the fluid-guiding portion 21. The storage portion 22 has a storage chamber 221. The storage chamber 221 is in communication with the fluid channel 211, and configured to store the detection fluid L1. The volume of the storage chamber 221 may be in a range from about 100 ul to 1000 ul. In some embodiments, the storage portion 22 is detachably disposed on fluid-guiding portion 21. The inspection portion 23 is disposed on the fluid-guiding portion 21, and has an inspection groove 231 connected to the fluid channel 211.

In the embodiment, the storage portion 22 may include a storage body 222 and a thin film 223. The storage body 222 is connected to the fluid-guiding portion 21, and the thin film 223 is connected to the storage body 222. The storage chamber 221 is formed in the storage body 222. The storage body 222 may be made by hard materials, such as polymer plastic materials. The thin film 223 covers the storage body 222 and the top portion of the storage chamber 221, and in contact with the detection fluid L1. The cam 32 of the pressing mechanism 30 is configured to press the thin film 223 of the storage portion 22.

As shown in FIG. 1, FIG. 2A and FIG. 2B, the user can rotate the handle 42 to make the cam 32 continually rotate about the central axis AX1 in a rotation direction R1. The rotation direction R1 may be clockwise or counterclockwise. As shown in FIG. 2A, when the cam 32 is away from the thin film 223, the thin film 223 is not pressed, and the detection fluid L1 does not flow into the fluid channel 211 and the inspection groove 231.

As shown in FIG. 1 and FIG. 2B, when the cams 32 are located at the pressing position of FIG. 2B, the cams 32 press the thin films 223 as so to deform the thin films 223, and the centers of the thin films 223 substantially move in the movement direction D2, and thus the detection fluid L1 in the storage chambers 221 is pushed and flows into the fluid channels 211 and the multiple inspection grooves 231. Therefore, the user can directly detect the detection fluid L1 in many inspection grooves 231 at the same time, thereby speeding up the detection of the detection fluid L1. In some embodiments, in FIG. 1, the fluid containers 20 can be integrated into one. The detection fluid L1 in two storage portions 22 can flow into the same inspection groove 231 of the inspection portion 23.

Accordingly, the fluid-drive device 1 of the present disclosure can guide the detection fluid L1 in the storage portion 22 into the inspection groove 231 without contacting some components other than the fluid container 20. Therefore, the pollution of the detection fluid L1 may be reduced, and the reliability of detection may be improved. Moreover, the fluid-drive device 1 of present disclosure does not require components such as pumps, valves and piping to prevent the detection fluid L1 from remaining to the components, thereby reducing the manufacturing and maintenance costs of the fluid-drive device 1.

In addition, the fluid-drive device 1 of the present disclosure can save power costs since the fluid-drive device 1 does not require electric drive. However, in some embodiments, the rotation mechanism 40 may include a motor (not shown), and the user can control the speed and operating time of the motor to drive the pressing mechanism 30 press the storage portion 22.

Figure 3:
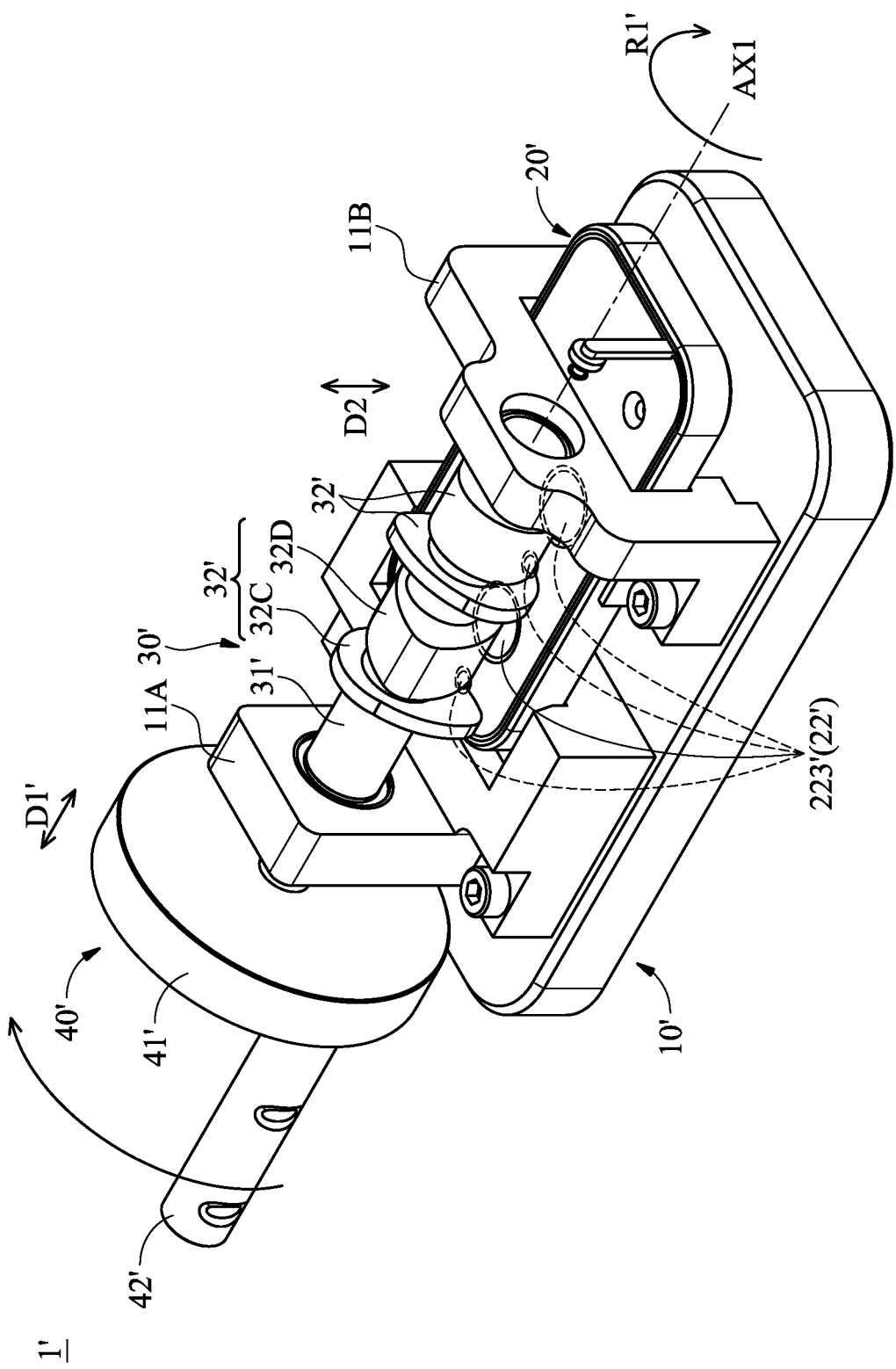
FIG. 3 is a perspective view of the fluid-drive device in accordance with a second embodiment.

FIG. 3 is a perspective view of the fluid-drive device 1' in accordance with a second embodiment. In the embodiment, the fluid-drive device 1' includes one fluid container 20', and the fluid container 20' has many storage portions 22'. The pressing mechanism 30' has one rotation shaft (first rotation shaft) 31', and many cams 32'. The rotation shaft 31' may pass through the centers of the cams 32' Moreover, the cams 32' are arranged on the rotation shaft 31' in the extension direction D1'. Moreover, the base 10' may include two support frames 11A and 11B. The rotation shaft 31' is pivoted on the support frame 11A and 11B, and passes through at least one support frame 11A and 11B.

The pressing mechanism 30' may include a connection plate (first connection plate) 41' and a handle (first handle) 41". The connection plate 41' is connected to the rotation shaft 31', and the handle 41" is connected to the connection plate 41'. When the user rotates the handle 41", the rotation shaft 31' is rotated in the rotation direction R1', and drives cams 32' to rotate with the rotation shaft 31' in the rotation direction R1' at the same time.

In the embodiment, when the user detects another fluid container 20' having different specifications, the existing pressing mechanism 30' can be removed from the base 10', and another pressing mechanism 30' can be install on the base 10'. Therefore, the cams 32' can be replaced by other cams 32' with different sizes, shapes and/or numbers so as to match the size, position and/or number of thin film 223' of the storage portion 22'.

In the embodiment, the number of cams 32' corresponds to the number of storage portions 22'. The thicknesses of the cams 32" may be different. The thickness of the cam 32' may correspond to the diameter of the storage portion 22' (or the thin film 223'). The thickness and the diameter may be measured in the extension direction D1'. For example, the thickness of the cam 32' and the diameter of the thin film 223' may be in a range from 1 mm to 10 mm.

In the embodiment, the shapes and sizes of cams 32' may be different (for example, the shapes and sizes of the cam 32C and the cam 32D are different). The longest length of the cam 32' may be in a range from 3 mm to 30 mm. The longest length of the cam 32' may be measured perpendicular to the extension direction D1'. In the embodiment, the larger the diameter of the thin film 223' is, the longer the maximum length of the cam 32' on the thin film 223' can be.

In the embodiments of the invention, the orientations of the cams 32 relative to the rotation shaft 31 may be different. Therefore, when the cams 32 are rotated in the rotation direction R1, the cams 32 can press the thin films 223 of the storage portion 22 at different times according to the setting of the pressing mechanism 30, thereby satisfying the requirement of the user to detect the detection fluid L1. For example, the detection fluid L1 in one of the storage portions 22 may be the blood of one patient, and the detection fluid L1 in remaining storage portions 22 may be the reaction reagent. Therefore, the detection fluid L1 in different storage portions 22 may flow into the same inspection groove 231 via different fluid channels 211. When the blood is mixed with different reaction reagents at different times, the blood can be detected and analyzed.

The following is the design of the cam 32 and the pressing element 33 of the embodiments of the invention. In the first embodiment, the cam 32 may drive the pressing element 33 for reciprocating motion, and the cam 32 and the pressing element 33 may be designed according to the diameter of the thin film 223 and the depth of the storage chamber 221. For example, if the thin film 223 is a hemispherical design with a radius of 8.5 mm, the contour design of the cam 32 may be set to allow the pressing element 33 to reciprocate from 0 mm to 8 mm. The motion mode of the cam 32 may not allow the jerk to be infinite during the start and end of the movement of the cam, wherein the jerk may be defined as the differential of acceleration versus time. Therefore, the cam 32 may be operated in a cycloidal motion of vibration.

The detailed motion of the cam 32 is described as follows. The pressing element 33 is in a dwell state when the cam 32 is rotated from 0 degree to 70 degrees in clockwise direction. When the cam 32 is rotated from 70 degrees to 170 degrees, the pressing element 33 may be moved down 8 mm from a stop position to start rise. When the cam 32 is rotated from 170 degrees to 190 degrees, the pressing element 33 may dwell at 8 mm. When the cam 32 is rotated from 190 degrees to 290 degrees, the pressing element 33 starts to return from 8 mm back to the original position. Finally, the pressing element 33 is in a dwell state when the cam 32 is rotated from 290 degrees to 360 degrees.

When determining the size of the base circle of the cam 32 and the size of the pressing element 33, the size of the cam 32 may be limited by the minimum base circle required for the movement of the entire cam 32 and the size of the flat pressing element 33. To determine the size of the cam 32 and the pressing element 33, the equation of the motion of the pressing element 33 under cycloidal motion may be discussed as follows. The displacement, velocity, acceleration, and jerk of the pressing element 33 under the cycloid motion may meet the following formula.

Displacement Formula:

$$f(\theta) = L\left(\frac{\theta}{\beta} - \frac{1}{2\pi}\sin\frac{2\pi\theta}{\beta}\right)$$

Velocity Formula:

$$f'(\theta) = \frac{L}{\beta}\left(1 - \cos\frac{2\pi\theta}{\beta}\right)$$

Acceleration Formula:

$$f''(\theta) = \frac{2L\pi}{\beta^2}\left(\sin\frac{2\pi\theta}{\beta}\right)$$

Jerk Formula:

$$f'''(\theta) = \frac{4L\pi^2}{\beta^3}\left(\cos\frac{2\pi\theta}{\beta}\right)$$

In the described formula, the L is the stroke of rising and falling, and the $\beta$ is the angle during the rising and falling process. When the motion equation of cycloid motion is obtained, the size of the base circle of the cam 32 and the size of the flat pressing element 33 may be determined according to the following formula.

Formula for the size of the base circle and the size of the plate follower:

$$r_b \geq -f(\theta) - f''(\theta)$$

$$T_{min} \geq f''(\theta)$$

In the described formula, the $r_b$ is defined as the minimum allowable radius of the base circle. If the value is negative, any positive value may be the minimum allowable radius. The $T_{min}$ is the minimum length of the plane of the flat pressing element 33.

The disclosed features may be combined, modified, or replaced in any suitable manner in one or more disclosed embodiments, but are not limited to any particular embodiments. For example, in the first embodiment, many cams 32 may be disposed on each of the rotation shafts 31 according to the second embodiment. Moreover, the cams 32 of the first embodiment and the second embodiment may be designed according to the described formula.

In conclusion, the fluid-drive device in the embodiments of the present disclosure guides the detection fluid in the storage portion to the inspection groove without contacting some components other than the fluid container. Therefore, the pollution of the detection fluid may be reduced, and the reliability of detection may be improved. Moreover, the fluid-drive device prevents the detection fluid from remaining to some components other than the fluid container, thereby reducing the maintenance costs of the fluid-drive device.

While the present disclosure has been described by way of example and in terms of preferred embodiment, it should be understood that the present disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fluid-drive device, comprising:
   a base;
   a fluid container disposed on the base;
   a pressing mechanism disposed on the base, and configured to press the fluid container; and
   a rotation mechanism connected to the pressing mechanism;
   wherein the rotation mechanism is rotated so as to make the pressing mechanism press the fluid container,
   wherein the fluid container comprises:
      a fluid-guiding portion having a fluid channel;
      a storage portion disposed on the fluid-guiding portion, and having a storage chamber in communication with the fluid channel;
      an inspection portion disposed on the fluid-guiding portion, and having an inspection groove connected to the fluid channel;
   wherein the pressing mechanism is configured to press the storage portion, and the storage chamber is configured to store detection fluid;
   wherein when the storage portion is pressed by the pressing mechanism, the detection fluid of the storage chamber flows to the inspection groove via the fluid channel.

2. The fluid-drive device as claimed in claim 1, wherein the pressing mechanism comprises:
   a first rotation shaft connected to the base and the rotation mechanism; and
   a first cam connected to the first rotation shaft, and configured to directly or indirectly press the fluid container;

wherein the first cam is rotated with the first rotation shaft by rotating the rotation mechanism.

3. The fluid-drive device as claimed in claim 2, wherein the pressing mechanism further comprises a second cam connected to the first rotation shaft, and configured to directly or indirectly press the fluid container;
wherein the second cam is rotated with the first rotation shaft by rotating the rotation mechanism.

4. The fluid-drive device as claimed in claim 3, wherein the first cam extends parallel to the second cam.

5. The fluid-drive device as claimed in claim 2, wherein the pressing mechanism comprises:
a second rotation shaft connected to the base and the rotation mechanism;
a second cam connected to the second rotation shaft, and configured to directly or indirectly press the fluid container;
wherein the second cam is rotated with the second rotation shaft by rotating the rotation mechanism.

6. The fluid-drive device as claimed in claim 2, wherein the pressing mechanism further comprises a pressing element movably disposed on the base, and located between the first cam and the fluid container, wherein the rotation mechanism is rotated so as to make the first cam move the pressing element, and to make the pressing element press the fluid container.

7. The fluid-drive device as claimed in claim 1, wherein the rotation mechanism comprises:
a first connection plate connected to the pressing mechanism; and
a first handle connected to the first connection plate.

8. The fluid-drive device as claimed in claim 7, wherein the rotation mechanism further comprises:
a second connection plate connected to the pressing mechanism;
a second handle connected to the second connection plate; and
a connection rod connected to the first handle and the second handle.

9. The fluid-drive device as claimed in claim 1, wherein the storage portion further comprises a storage body, and a film disposed on a portion of the storage body, wherein the pressing mechanism is configured to press the film.

10. A fluid-drive device, comprising:
a base;
a fluid container disposed on the base;
a pressing mechanism disposed on the base, and configured to press the fluid container; and
a rotation mechanism connected to the pressing mechanism;
wherein the rotation mechanism is rotated so as to make the pressing mechanism press the fluid container,
wherein the rotation mechanism comprises:
a first connection plate connected to the pressing mechanism; and
a first handle connected to the first connection plate,
wherein the rotation mechanism further comprises:
a second connection plate connected to the pressing mechanism;
a second handle connected to the second connection plate; and
a connection rod connected to the first handle and the second handle.

11. The fluid-drive device as claimed in claim 10, wherein the pressing mechanism comprises:
a first rotation shaft connected to the base and the rotation mechanism; and
a first cam connected to the first rotation shaft, and configured to directly or indirectly press the fluid container;
wherein the first cam is rotated with the first rotation shaft by rotating the rotation mechanism.

12. The fluid-drive device as claimed in claim 11, wherein the pressing mechanism further comprises a second cam connected to the first rotation shaft, and configured to directly or indirectly press the fluid container;
wherein the second cam is rotated with the first rotation shaft by rotating the rotation mechanism.

13. The fluid-drive device as claimed in claim 12, wherein the first cam extends parallel to the second cam.

14. The fluid-drive device as claimed in claim 11, wherein the pressing mechanism comprises:
a second rotation shaft connected to the base and the rotation mechanism;
a second cam connected to the second rotation shaft, and configured to directly or indirectly press the fluid container;
wherein the second cam is rotated with the second rotation shaft by rotating the rotation mechanism.

15. The fluid-drive device as claimed in claim 11, wherein the pressing mechanism further comprises a pressing element movably disposed on the base, and located between the first cam and the fluid container, wherein the rotation mechanism is rotated so as to make the first cam move the pressing element, and to make the pressing element press the fluid container.

* * * * *